Aug. 11, 1936.  J. M. YOUNGER  2,050,597
DEHYDRATOR
Filed Feb. 7, 1934  2 Sheets-Sheet 1

INVENTOR:
Joshua M. Younger

Aug. 11, 1936.   J. M. YOUNGER   2,050,597
DEHYDRATOR
Filed Feb. 7, 1934   2 Sheets-Sheet 2

INVENTOR:
Joshua M. Younger

Patented Aug. 11, 1936

2,050,597

UNITED STATES PATENT OFFICE 2,050,597

DEHYDRATOR

Joshua M. Younger, Alameda, Calif., assignor to James M. Thorp, Alameda, Calif.

Application February 7, 1934, Serial No. 710,040

5 Claims. (Cl. 34—39)

Figure 2:
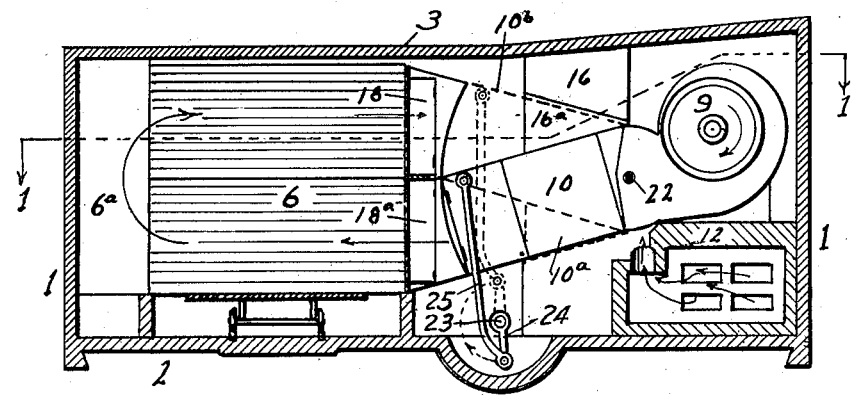
Figure 1:
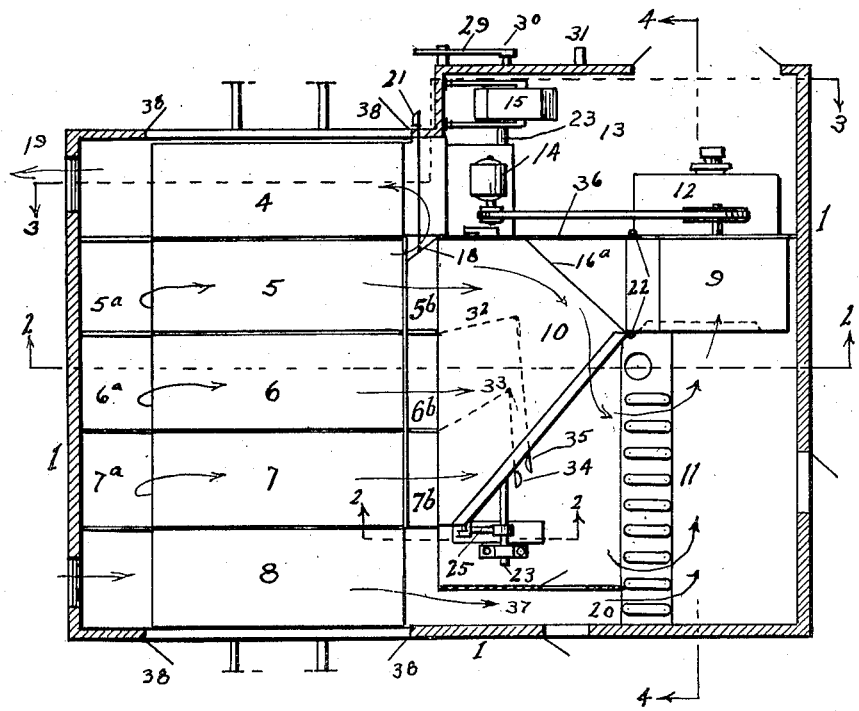
Figure 3:
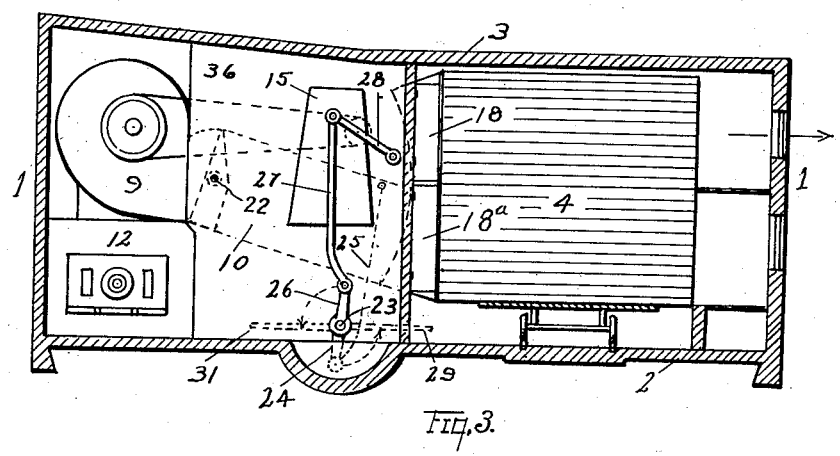
Figure 4:
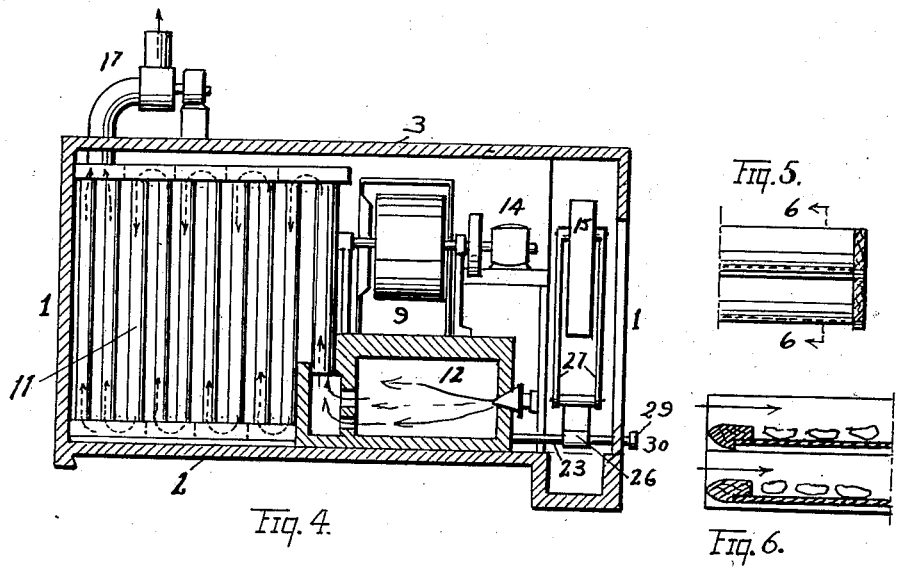
Figure 5:
Figure 6:
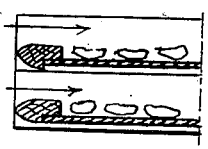

The invention relates to hot air circulation dehydrators for drying fruit, vegetables and other foods, any or all of which will hereinafter be known as "fruit". One object of the invention is to provide a dehydrator wherein stacks of fruit trays are moved progressively through, first a conditioning chamber, a drying chamber and lastly a finishing chamber; another object is to utilize all the heat that is generated in the dehydrator, including that contained in the humid air that is usually expelled into the atmosphere, together with the heat absorbed by the finished fruit and by the trays containing such fruit; and a further object is to economize in the size of the hot air equipment by treating, alternately, first one half of the fruit, then the other half and by changing the direction of air flow at frequent intervals so that all trays will receive a like treatment during their progress through the several chambers; still further objects, some of which, with the foregoing, will be set forth in the following specification and accompanying drawings, in which:

Figure 1 is a horizontal section on line 1—1 of Fig. 2; Fig. 2, a longitudinal elevation in section, on line 2—2 of Fig. 1; Fig. 3, a sectional elevation, in reverse of Fig. 2 and on line 3—3 of Fig. 1; Fig. 4, a cross sectional elevation on line 4—4 of Fig. 1; Fig. 5, a fragmentary end view of two fruit trays as superposed; and Fig. 6 a cross section of the trays on line 6—6 of Fig. 5.

Similar numerals denote similar parts throughout the several views:

A dehydrator according to this invention is disposed within a housing structure, the walls of which are designated by the numeral 1, the floor 2 and the roof 3; the numeral 4 denotes the stack of fruit trays representing the conditioning chamber; 5, 6 and 7, the drying chamber and 8, the finishing chamber. By referring to Fig. 5, it is seen that the superposed trays form a solid wall on the sides thereof so that each stack forms its own chamber to that extent. The numeral 9 denotes the blower; 10, the oscillating funnel discharge; 11 the stack of radiator tubes; 12, the furnace; 13, the power room; 14, the motor and 15 the compensating weight to balance the oscillating discharge funnel; 10, 16 and 16a show plates set on an angle to divert the returning air flow toward the radiator, these plates telescope, one part fixed to the oscillator and its mate to the roof and another pair below, one of which is fixed to the floor.

In dehydrators according to this invention the furnace 12 is preferably heated by fuel oil, the heat fumes thereof are drawn through the radiator tubes 11 by the exhaust fan 17, so as to traverse each tube alternately up and down as shown by arrows in Fig. 4.

For a clearer description it is assumed that several trucks carrying the tray stacks 4 to 8 have reached their respective positions, progressively upon the tracks, that is, stack 4 is newly placed, 5 has occupied space 4 for say three hours and has been moved to 5, each of the other stacks have occupied the preceding space for the same time, so that 8 has just been moved from 7 to its present position; 5 to 8 have all been subjected to the hot air treatment progressively and 8 is sufficiently dried to be cooled off, however, the trays and the fruit therein have absorbed large quantities of heat at a temperature of approximately 150 degrees, whereas stack 4 is cold; 5, 6 and 7 are in progressive steps of drying; it is further assumed that the furnace and radiators are in heated condition and that the blower is forcing heated air through the lower half of the stacks 5, 6 and 7 as shown in Fig. 1 and in the depressed oscillating discharge 10a Fig. 2; at this point description of the operation is taken up.

The air being forced through the lower half of the three center stacks is returned through the upper half, where it is spread out and flows through the radiators, absorbing heat therefrom, and thence to the blower intake where it is again forced into the tray stacks and over the fruit absorbing moisture therefrom in its passage, thus a staturated condition of the air would result in time, but to avoid such saturation a portion of the air is continuously deflected by the baffle 18 into the upper half of stack 4, passing out at the opening 19. Although this deflected air contains a high percentage of moisture it also contains a great quantity of heat which would be lost if discharged into the atmosphere in the usual manner, instead it is here utilized for conditioning the fruit at first stage. In practice it is found that slow initial warming of the fruit throughout, before subjecting it to the hot blast of air, prevents glazing of the surface thus allowing the fruit to dry from the inside outwardly. As the humid air is taken out at one end, fresh air is being drawn in through stack 8 where it absorbs heat from the now completely dry fruit and also from the heated trays in this process of cooling, the fresh air now passes through the radiator at 20 and on into the blower intake to be mixed with the main volume of air to lower its humidity.

By directing the air blast through only half of the tray area and returning through the other half the blower and heater equipment may be of smaller capacity than if the whole tray area were exposed at once.

The foregoing description and the drawings show the funnel blower discharge 10 in lower position 10a, with the return air flowing through the upper half, where in stack 5 the baffle 18 is shown cutting out or deflecting a portion of the air to the upper half of stack 4. The funnel discharge is to be oscillated at intervals of two or three times per hour, according to the fruit being treated; obviously, a reverse flow of air through all the trays except 8 will result when the discharge is raised as at 10b, in dotted lines Fig. 2; the baffle 18 will then be closed and baffle 18a will be opened by the rod 21, then the lower half of stack 4 will receive the deflected air while the upper half remains quiescent to absorb heat from the still air. It will be noted that the rear and front stationary chambers 5a to 7a and 5b to 7b inclusive are extensions to the movable tray-formed chambers 5, 6 and 7, and as the latter move forward their numbers change with location.

When these stacks have stood for the necessary time subject to several changes in air flow direction the doors are opened at both ends of the chambers and a fresh stack of trays is set against stack 4, then the whole line is moved one space, thus stack 8 is moved into the open and stack 4, now conditioned, is set into the drying chamber and the new stack into the conditioning chamber, then the doors are closed.

The oscillating funnel is pivoted to the blower at 22, the other end is raised and lowered by action of the shaft 23 and arm 24, one on each side, and the connecting rods 25; it is counterbalanced by the weight 15 which is supported by the rods 27 pivoted at top to the weight and at bottom to the arm 26, this arm, or crank, is fixed to the shaft diametrically opposite the arm 24, both on the shaft 23, the weight being held by the sway arm 28 which is pivoted to the rear wall; a lever 29 is keyed to the shaft end outside the wall at 30; it is obvious that, in the position shown in Fig. 3, with arm 26 at upper dead center and arm 24 at lower dead center, that if the lever 29 is thrown up and over to 31 the discharge funnel 10 will be raised to the position 10b and the weight of the funnel will be balanced by the weight 15; the continuous opposite positions of these arms will compensate for the varying leverage exerted by each in the traveled arc.

Baffles 32 and 33 are provided in the funnel 10, as in dotted lines Fig. 1, as shown they are set so as to give a greater volume, or proportion of air into stack 5, a lesser volume to stack 6 and still less to stack 7 but may be varied by the rods 34 and 35; 5a, 6a and 7a are the return air chambers for the three central stacks. The power room 13 is divided from the blower by a metal wall 36 and the alley 37 leading from the finishing chamber is likewise closed in. Although the tray sides form a solid wall separating the stacks and virtually close in the conditioning chamber and the finishing chamber, doors 38 are provided to further seal the housing.

Having thus described my invention in a manner understood by those skilled in the art, what I claim as new and desire to secure by Letters Patent is:

1. A fruit dehydrator, comprising a housing structure containing a conditioning chamber, a drying chamber and a finishing chamber, tracks leading through said structure and chambers, trucks upon the tracks, stacks of trays superposed upon the trucks, a furnace, and a radiator adapted to carry fumes therefrom, a blower to discharge air into and through a portion of said stacks of trays and into a return air chamber where the air is returned through the other portion of the trays, through a radiator and to the blower intake, an oscillating blower discharge pivoted to the blower whereby a change of air flow may be had from one of said tray portions to the other portion in alternation, baffles to deflect the humid air into the conditioning chamber, a fresh air inlet leading through said finishing chamber and said radiator to the blower intake, baffles within the oscillating discharge adapted to proportion the air between the drying stacks, and means to counterbalance and oscillate said blower discharge.

2. A fruit dehydrator consisting of housed tray-formed drying chambers and a conditioning chamber, a blower having a funneled air discharge adapted to oscillate alternately between the upper and lower portions of said drying chambers, rear extension chambers adapted to return the air in alternation with said air discharge, front extension chambers located at the air discharge, baffles in said front extension chambers adapted to be alternately opened and closed to deflect a portion of the return air into the conditioning chamber.

3. A fruit dehydrator comprising a housing structure, a series of tray-formed chambers disposed therein, a blower having an oscillating discharge funnel, air heating means connected with said blower, shaft, crank and connecting rod means for oscillating the discharge funnel, and mounted upon the same shaft an opposed crank and connection rods, supporting a weight having sway-arm guides, in counter-balance to the funnel discharge, and a lever fixed to the shaft of said crank for manual operation of said weight and said funnel.

4. A fruit dehydrator comprising a housing structure and a conditioning chamber disposed at the entrance side of the structure, a series of drying chambers adjoining the conditioning chamber, superposed baffles mounted in the front extension to the first of said series of drying chambers, and means for operating said baffles whereby a portion of the return air from the drying chamber is deflected into and through the upper or the lower portion of the conditioning chamber.

5. A fruit dehydrator comprising a housing structure, tracks laid laterally of the structure, trucks loaded with superposed trays upon the tracks, a blower with pivoted funnel discharge adapted to force heated air through a portion of the trays, air chambers disposed opposite the blower discharge and adapted to return said heated air through another portion of the trays to the blower intake, adjustable baffles within said pivoted funnel discharge adapted to proportion the air between the several tray stacks, and manual means for oscillating the discharge funnel.

JOSHUA M. YOUNGER.